(12) United States Patent
Kanai et al.

(10) Patent No.: US 12,704,448 B2
(45) Date of Patent: Aug. 11, 2026

(54) RHEOLOGY AND DIELECTRIC SPECTROSCOPY MEASUREMENT SYSTEMS

(71) Applicant: TA Instruments-Waters LLC, New Castle, DE (US)

(72) Inventors: Jun Kanai, Saitama (JP); Scott Merrullo, South Hamilton, MA (US); Yuki Kawata, Osaka (JP)

(73) Assignee: TA Instruments-Waters LLC, New Castle, DE (US)

( * ) Notice: Subject to any disclaimer, the term of this patent is extended or adjusted under 35 U.S.C. 154(b) by 347 days.

(21) Appl. No.: 18/459,228

(22) Filed: Aug. 31, 2023

(65) Prior Publication Data

US 2025/0003850 A1 Jan. 2, 2025

Related U.S. Application Data

(60) Provisional application No. 63/523,590, filed on Jun. 27, 2023.

(51) Int. Cl.
*G01N 11/14* (2006.01)
*G01N 27/02* (2006.01)

(52) U.S. Cl.
CPC ........... *G01N 11/14* (2013.01); *G01N 27/026* (2013.01)

(58) Field of Classification Search
CPC ............................. G01N 11/14; G01N 27/026
See application file for complete search history.

(56) References Cited

U.S. PATENT DOCUMENTS 5,417,314 A 5/1995 Sproston et al.
6,255,954 B1 * 7/2001 Brown ....................... B41J 2/01 73/304 R
11,674,915 B2 * 6/2023 Potyrailo ............. G01N 27/026 73/1.01
2006/0027738 A1 2/2006 Berting et al.
2009/0293595 A1 12/2009 Hayashi
2010/0071443 A1 3/2010 Wrench et al.
2012/0137753 A1 6/2012 Hayashi
2014/0311224 A1 * 10/2014 Lauger ................. G01N 11/142 73/54.28

(Continued)

FOREIGN PATENT DOCUMENTS

CN 100381808 C 4/2008
DE 202007000151 U1 4/2007

(Continued)

OTHER PUBLICATIONS

JP2009115747, english translation from iq.ip.com.*

(Continued)

*Primary Examiner* — Kristina M Deherrera
*Assistant Examiner* — Jean F Morello
(74) *Attorney, Agent, or Firm* — Schmeiser Olsen, PLLC; Timothy P. Collins, Esq.

(57) ABSTRACT

An apparatus for performing electrical and rheology measurements of a material sample, comprises a first plate; a second plate; a rotatable drive shaft extending from a motor to rotate the first plate relative to the second plate; and a sample gap between the first plate and the second plate. The second plate includes first and second electrodes that receive a voltage and form an electric field at the sample gap.

29 Claims, 8 Drawing Sheets

(56) References Cited

U.S. PATENT DOCUMENTS

| | | | | |
|---|---|---|---|---|
| 2019/0331577 | A1 | 10/2019 | Leyser | |
| 2021/0372908 | A1 | 12/2021 | Merrullo et al. | |
| 2024/0272109 | A1* | 8/2024 | De Bellis | G01N 11/142 |

FOREIGN PATENT DOCUMENTS

| | | | | |
|---|---|---|---|---|
| DE | 102007007461 | A1 | 8/2008 | |
| FR | 3009618 | A1 | 2/2015 | |
| JP | S60210751 | A | 10/1985 | |
| JP | 2000180486 | A | 6/2000 | |
| JP | 2009115747 | A | 5/2009 | |
| KR | 20230150662 | A | 10/2023 | |
| WO | WO-2008098714 | A1 * | 8/2008 | G01N 11/00 |
| WO | 2022254350 | A1 | 12/2022 | |

OTHER PUBLICATIONS

WO2008098714, english translation from worldwide.espacenet.com.*

JPS60210751, english translation from iq.ip.com.*

International Search Report and Written Opinion in PCT/US2023/031762 mailed on Feb. 12, 2024.

International Search Report and Written Opinion in PCT/US2024/057596 mailed on Feb. 7, 2025.

International Search Report and Written Opinion in PCT/US2024/018996 mailed on Jun. 13, 2024.

"Polymer Fluids Group News: 2010" Cambridge University, https://www.ceb.cam.ac.uk/research/groups/rg-p4g/archive-folder/pfg/polymer-processing-research-folder/news/polymer-fluids-group-news-2010.

Knappe, et al. "Simultaneous Rheological-Dielectrical Characterization Using the HAKKE MARDS Rheometer Platform," Thermo Fisher Scientific Inc., 2015.

Oldorp, Klaus "Stability of cosmetic emulsions quantified with rheology and simultaneous DEA" Thermo Fisher Scientific Inc., 2019.

Richards, et al. "Dielectric RheoSANS—Simultaneous Interrogation of Impedance, Rheology and Small Angle Neutron Scattering of Complex Fluids," Journal of Visualized Experiments, Apr. 2017, 122, pp. 1-11. https://www.jove.com/video/55318.

"Discovery Hybrid Rheometers Temperature Systems and Accessories," Aug. 2022, TA Instruments/Waters Corporation.

"Dielectric Measurement" Aug. 2022, TA Instruments. https://www.tainstruments.com/dielectric-measurement/.

Richards, Jeffrey J. and John K. Riley "Dielectric RehoSANS: a mutual electrical and rheological characterization technique using small-angle neutron scattering,"Current Opinion in Colloid & Interface Science 2019, 42, pp. 110-120.

Helal, Ahmad, Thibaut Divoux, and Gareth H. Mckinley "Simultaneous Rheoelectric Measurements of Strongly Conductive Complex Fluids," American Physical Society, Physical Review Applied 6, 064004, pp. 1-19, (2016).

Liu, Qingsong and Jeffrey Richards "Supplementary Information for Rheo-Electric Measurements of Carbon Black Suspensions Containing Polyvinylidene Diflouride" in N-Methyl-2-Pyrrolidone, 2023.

Liu, Qingsong and Jeffrey J. Richards "Rheo-electric measurments of carbon black suspensions containing polyvinylidene diflouride in N-methyl-2-pyrrolidone" Journal of Rheology 67, pp. 647-659, (2023).

Kawata, Yuki, Jeremy May, and Hang Lau "Structural Characterization of Carbon Black Paste for Li-ion Battery Electrodes Using Simulaneous Rheology and Electrochemcial Impedance Spectroscopy" 2023. https://www.tainstruments.com/applications-notes/structural-characterization-of-carbon-black-paste-for-li-ion-battery-electrodes-using-simultaneous-rheology-and-electrochemical-impedance-spectroscopy/.

Franck, A. "Dielectric Option for ARES" TA Instruments, Sep. 6, 2017.

Franck, Aly "Dielectric Characterization" Sep. 2012. https://www.tainstruments.com/pdf/literature/APN032%20Dielectric%20characterization_V1_ajf_30SEP12.pdf.

Chen, Tianhong Terri "Simultaneous Rheology-Dielectric Measurements of Epoxy Curing," TA Instruments, Jun. 23, 2020.

International Preliminary Report on Patentability in PCT/US2023/031762 mailed on Jan. 8, 2026.

International Preliminary Report on Patentability in PCT/US2024/018996 mailed on Jan. 8, 2026.

* cited by examiner

| | | | | Far Plate | 1 | | pF | |
|---|---|---|---|---|---|---|---|---|
| gap | 0.001 | m | | | | | | |
| t | 0.002 | m | | | Measured | Corrected | Units | Theoretical |
| A | 0.000781748 | m^2 | | 250 | 11.2 | 10.2 | pF | 1.38E+01 |
| e | 8.85E-12 | F/m | | 500 | 7.06 | 6.06 | pF | 6.92E+00 |
| Capacitance | 3.46E-12 | F/m | | 1000 | 4.32 | 3.32 | pF | 3.46E+00 |
| | | | | 1500 | 3.25 | 2.25 | pF | 2.31E+00 |
| | | | | 2000 | 2.67 | 1.97 | pF | 1.73E+00 |
| | | | | 2500 | 2.31 | 1.31 | pF | 1.38E+00 |
| | | | | 3000 | 2.06 | 1.06 | pF | 1.15E+00 |
| | | | | 3500 | 1.89 | 0.89 | pF | 9.89E-01 |
| | | | | 4000 | 1.75 | 0.75 | pF | 8.65E-01 |

$$C = \frac{\varepsilon A}{d} = \frac{k\varepsilon_0 A}{d}$$

RHEOLOGY AND DIELECTRIC SPECTROSCOPY MEASUREMENT SYSTEMS

RELATED APPLICATIONS

This application claims the benefit of the earlier filing date of U.S. Provisional Patent Application Ser. No. 63/523,590 filed Jun. 27, 2023 and titled "Rheology and Dielectric Spectroscopy Measurement Systems" the entirety of which is incorporated herein by reference.

FIELD OF THE INVENTION

The disclosed technology relates generally to a device for measuring properties of materials. More particularly, the technology relates to a device for measuring rheological properties of test samples and simultaneously performing an impedance spectroscopy technique on the samples.

BACKGROUND

Rheometers are well-known for measure the relationships between stress and strain or strain rate by measuring the displacement, and more specifically torque, of a moving measurement in a finite sample volume defined by an upper and lower geometry, generally in the form of plates or the like, over a measured period of time. These measurements are often performed with an actively controlled temperature. Dielectric spectroscopy or impedance spectroscopy, for example, electrochemical impedance spectroscopy, is used to study the response of a sample subjected to an applied electric field by measuring the dielectric properties of a material sample as a function of frequency. It is often desirable to perform electrical measurements in-situ during rheological measurements to correlate the electrical and rheological measurements, for example, the study the relationship between the rheo-dielectric effect and the elasticity of viscoelastic materials.

Current state-of-the-art rheometers achieve concurrent electrical and rheological measurements by applying a voltage is applied to each geometry so that electric fields and current flows from one geometry, i.e., the rotating plate, through the sample to the other geometry, i.e., the stationary plate. When taking measurements, liquid or dry friction contacts such as spring brushes, slip rings, liquid electrolyte, and the like are employed to conduct current to or from the moving geometry which continuously rotates during the measurements. However, electrical contact adds undesirable solid or liquid contact with the motor shaft or other geometry assembly, resulting in friction torque to the rheological measurements and/or add undesirable electrical impedance to the electrical impedance measurement that can limit the sensitivity of the instrument. Torque measurements are more accurate if the only torque contribution only comes from the sample. Consequently, the resolution of both types of measurements is decreased due to a degraded signal to noise ratio.

SUMMARY

In one aspect, an apparatus for performing electrical and rheology measurements of a material sample comprises a first plate having a conductive surface; a second plate; a rotatable drive shaft extending from a motor to rotate the first plate relative to the second plate; and a sample gap between the first plate and the second plate. The second plate includes first and second electrodes that receive a voltage and form an electric field at the sample gap between the conductive surface of the first plate and the first and second electrodes at the second plate.

The electrical measurements may include impedance spectroscopy measurements.

The second plate may include a thermally conductive insulator for isolating the first electrode from the second electrode, and may further isolate the first electrode and the second electrode from an environment of the apparatus. The first electrode and the second electrode may be thermally coupled to the environment.

Thermally conductive insulator may include a ceramic coating.

The second plate may be formed of a metal material and the thermally conductive insulator is coupled to the metal plate for forming the first and second electrodes from the metal material.

A geometry of the first and second electrodes may be determined by the thermally conductive insulator.

The thermally conductive insulator may have a first straight edge in communication with the first electrode and a second straight edge parallel to the first straight edge in communication with the second electrode. The first straight edge may be separated from the second straight edge by a width that conductively insulates the first electrode from the second electrode.

The rotatable drive shaft may include an insulative material.

The first and second electrodes may form a current path and/or electric field from the first and second electrodes through the material sample at the sample gap to the first plate.

The first plate may have a stainless steel surface for forming the current path and/or electric field with the first and second electrodes.

The apparatus may further comprise a processor that correlates current flow measurements and torsional force measurements at the first plate in contact with the material sample.

The apparatus may further comprise a sensor that detects current flow of the electric field through a material sample at the sample gap and generates the current flow measurements.

The apparatus may further comprise a processor that determines from a current at the motor the torsional force measurements.

The apparatus may further comprise a temperature control device that exchanges a thermal conduction with the second plate.

The first and second electrodes may receive voltages of different polarities to form the current path and/or electric field with the first plate through the material sample in the gap.

In another aspect, an apparatus for performing electrical and rheology measurements of a material sample comprises a first plate; a second plate; a rotatable drive shaft extending from a motor to rotate the first plate relative to the second plate and to induce a torsional force on the first plate; and a sample gap between the first plate and the second plate, the torsional force applied on the first plate in contact with a material sample at the sample gap. The second plate includes a first electrode; a second electrode; and a thermally conductive insulator that conductively insulates the first electrode from the second electrode and insulates the first and second electrodes from an environment of the apparatus.

The first and second electrodes induce an electric field through the material sample at the sample gap.

The electrical measurements may include impedance spectroscopy measurements.

The thermally conductive insulator may include a ceramic coating.

The second plate may be formed of a metal material and the thermally conductive insulator is coupled to the metal plate for forming the first and second electrodes from the metal material.

The rotatable drive shaft may include an insulative material.

The first and second electrodes may form the electric field including a current path from the first and second electrodes through the material sample at the sample gap to the first plate.

The first plate may have a stainless steel surface for forming the electric field with the first and second electrodes.

The apparatus may further comprise a processor that correlates current flow measurements and torsional force measurements at the first plate in contact with the material sample.

The apparatus may further comprise a sensor that detects current flow of the electric field through a material sample at the sample gap and generates the current flow measurements.

The apparatus may further comprise a processor that determines from a current at the motor the torsional force measurements.

The apparatus may further comprise a temperature control device that exchanges a thermal conduction with the thermally conductive insulator of the second plate.

The first and second electrodes may receive voltages of different polarities to form the electric field with the first plate through the material sample in the gap.

In another aspect, an apparatus for measuring rheological and electrical properties of a sample comprises a first geometry comprising an electrically conductive surface and a rotatable element for rotating the first geometry; a second geometry comprising a thermally insulative surface, the first geometry configured to rotate relative to the second geometry; and a gap between electrically conductive surface of the first geometry and the thermally insulative surface of the second geometry. The second geometry further comprises a first electrode and a second electrode that form an electric field through the gap with the electrically conductive surface of the first geometry in response to application of a voltage applied across the first and second electrodes.

BRIEF DESCRIPTION OF THE DRAWINGS

The above and further advantages of this invention may be better understood by referring to the following description in conjunction with the accompanying drawings, in which like numerals indicate like structural elements and features in the various figures. For clarity, not every element may be labeled in every figure. The drawings are not necessarily to scale, emphasis instead being placed upon illustrating the principles of the invention.

DETAILED DESCRIPTION

Reference in the specification to an embodiment or example means that a particular feature, structure or characteristic described in connection with the embodiment or example is included in at least one embodiment or example of the teaching. References to a particular embodiment or example within the specification do not necessarily all refer to the same embodiment or example.

The present teaching will now be described in detail with reference to exemplary embodiments or examples thereof as shown in the accompanying drawings. While the present teaching is described in conjunction with various embodiments and examples, it is not intended that the present teaching be limited to such embodiments and examples. On the contrary, the present teaching encompasses various alternatives, modifications, and equivalents, as will be appreciated by those of skill in the art. Moreover, features illustrated or described for one embodiment or example may be combined with features for one or more other embodiments or examples. Those of ordinary skill having access to the teaching herein will recognize additional implementations, modifications, and embodiments, as well as other fields of use, which are within the scope of the present disclosure as described herein.

In brief overview, embodiments and examples disclosed herein are directed to a measuring apparatus such as a rheometer or the like for performing rheo-dielectric and/or electro-rheology measurements such as impedance spectroscopy, for example, electrochemical impedance spectroscopy (EIS). To achieve this, the apparatus has parallel geometries separated by a gap in which a material sample is positioned. One of the geometries is rotated by a DC motor relative to the other geometry. During rotation of the geometry, the apparatus measures the torque/stress and or displacement/strain of the material sample. The stationary geometry has two electrodes electrically insulated from each other by a thermally conductive insulator, such as ceramic, polymer such as plastic, and so on, which may include a thin insulating coating with minimum thermal resistance to protect the insulator, e.g., ceramic, from the sample. The thermally conductive insulator provides the thermal conduction of heat to/from the sample plate from/to a temperature control device. The drive shaft extending from the motor to the rotating geometry is also insulated to ensure that the capacitance and conductance between the plate and the environment are minimized, and that electrical impedance is maximized. Thus, the two electrodes on the static geometry avoid the need for any electrical contact with the moving part of the drive motor, which may otherwise influence torque measurements.

Figure 2:
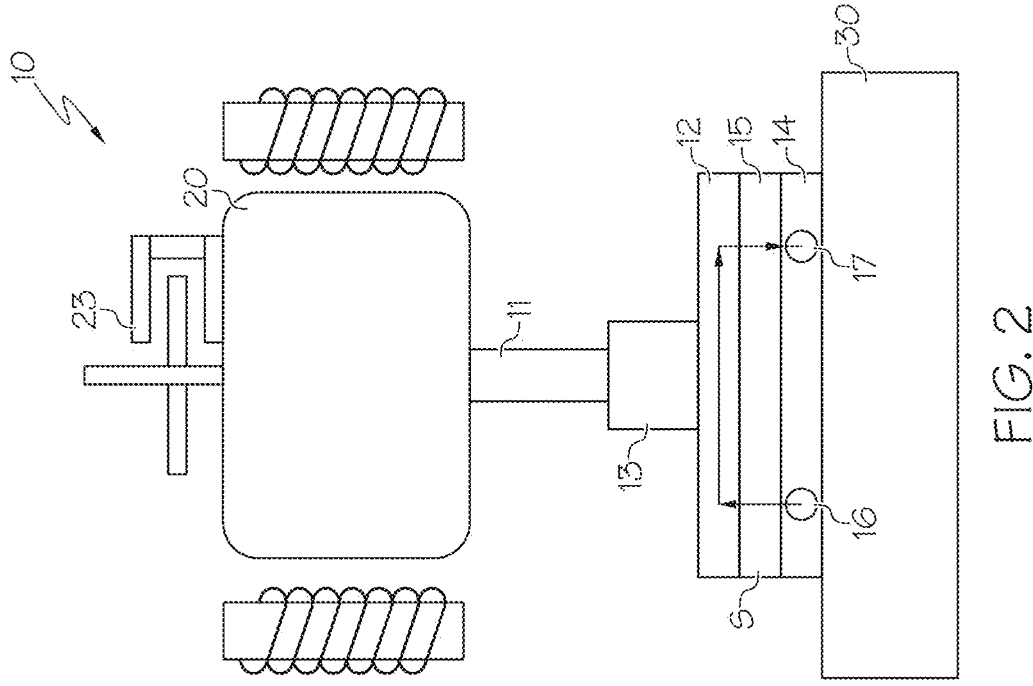
FIG. 2 is a cross-sectional front view of the rheometer of FIG. 1, including an illustration of a path of current and electric field lines and applied torque with respect to a material sample under analysis.
Figure 1:
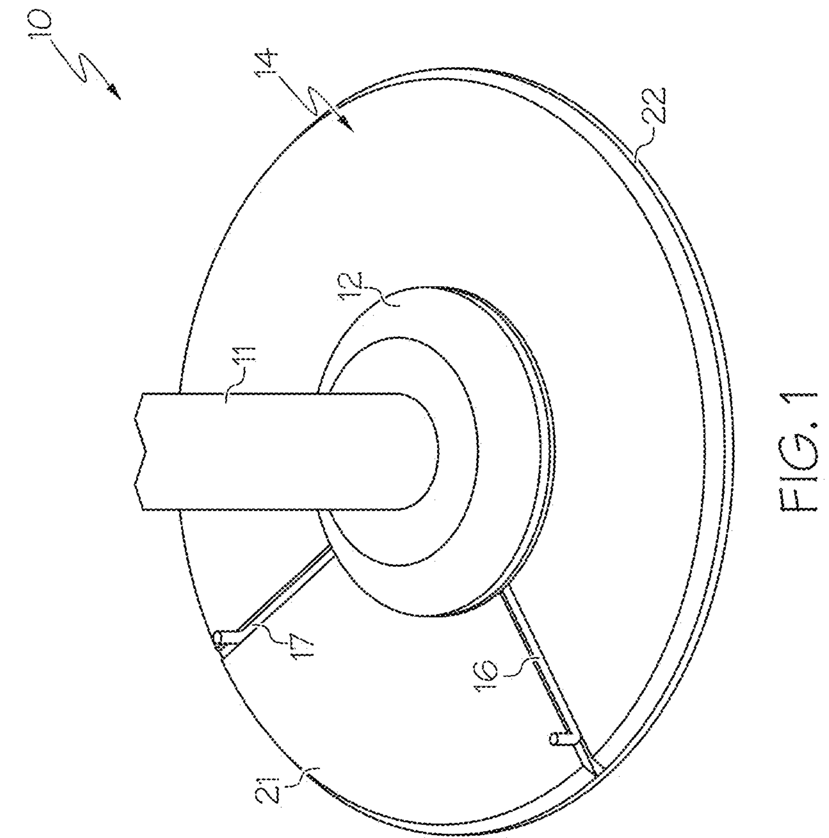
FIG. 1 is a perspective view of a rheometer in accordance with some embodiments of the present inventive concept.

FIG. 1 is a perspective view of a rheometer 10 in accordance with embodiments of the present inventive concept. FIG. 2 is a cross-sectional front view of the rheometer of FIG. 1, including an illustration of a conductive flow path and applied torque with respect to a material sample under analysis.

In some embodiments, the rheometer 10 is a parallel-geometry rheometer including a top plate 12 (also referred to as a first plate) and a bottom plate 14 (also referred to as a second plate), each having a specific predetermined geometry for performing measurements. During operation, a material sample(S) is placed between the plates 12, 14 which are separated by a gap 15 having a known width. The sample(S) is sheared by applying a force to the top plate 12 while the lower plate 14 is stationary relative to the top plate 12. This results in a deformation of the sample in the gap 15 between the plates 12, 14, which can be characterized in terms of the shear stress and the shear strain. From these quantities and the dimensions of the sample, a shear modulus may be calculated. For example, measurements can be taken about the viscoelastic behavior in which the shear modulus is independent of the shear strain, and more specifically, the stress-strain relationship to understand the flow/deformation properties of the material sample.

In some embodiments, the bottom plate 14 has a first electrode 16 and a second electrode 17 for forming an electric field in the sample. The configuration does not require electrical contact with the rotating top plate 12 by a conductive element, which may otherwise induce additional undesirable torque to the rheology measurements. This is because the moving plate acts as a passive conductor, and not a component requiring electrical contact as in the prior art. As shown in the flow arrows of FIG. 2, the top plate 12 operates as a passive conductor to create a path that initiates from first electrode 16, through the sample to the top plate 12, then from the top plate 12 through the sample again to the second electrode 17. This way, there is no electrical contact with the moving plate 12 and without the addition of undesirable electrical impedance to the drive shaft 11, torque sensitivity and mechanical measurements can be maintained.

In some embodiments, an external instrument such as an LCR meter can be coupled to the first electrode 16 and second electrode 17 to apply an oscillating voltage to the rheometer 10. The applied voltage, frequency, and so on can be controlled by the external instrument. The LCR meter may include sensors to measure the current flow of other resulting electrical signals from the applied voltage. A processor (not shown) can include program code to synchronize the electrical measurements with the rheology measurements in time.

In some embodiments, the bottom plate 14 has a metal surface 22 that is partially or completely covered with a thermally conductive insulator 21, such as ceramic, plastic, or other material having favorable heat dissipation and dielectric strength features. The thermally conductive insulator provides the thermal conduction of heat to/from the sample plate from/to a temperature control device 30. The temperature control device 30 can include a Peltier element, conductive or convention elements, or other well-known components for applying a change in temperature to the bottom plate 14.

In some embodiments, the drive shaft 11 includes a coupling 13 formed of an insulative material such as plastic. The coupling 13 connects the top plate 12 to the shaft 11 and electrically isolates the top plate 12 from the shaft 11 and environment where current may be present. The electrodes 16, 17 in the bottom plate 14 having opposite polarity voltages are isolated from each other so that one electrode 16 forms a potential across the sample gap 15 to the top plate 12 and back to the other electrode 17. Each electrode 16, 17 can be connected to a source, for example, a high potential and low potential connector, respectively. The permits the external source to apply an oscillating voltage to the electrodes 16, 17 and measure a current flow that can be used by a computer to determine the impedance in the sample gap 15. This can be performed over time to determine the conductive and capacitive components of the reactance.

In some embodiments, the rheometer 10 has at least one sensor 23 of a motor assembly 20, for example, an optical encoder, that measures a displacement, or torque caused by a rotation of the drive shaft 11 and forces applied to the sample(S) positioned in the gap 15 between the top plate 12 and the bottom plate 14. In other embodiments, a computer processor can calculate torsional force measurements from the motor current. During operation, the top plate 12 rotates and in doing so the motor can provide torque to the sample (S). The sensor 23 can measure the rotational rate of the top plate 12. In some embodiments, an electrical current is applied onto the motor assembly 20. The current builds up a magnetic field which produces an electrical torque resulting in a rotation of the drive shaft 11. There is no separate torque sensor needed since the rotational rate of the top plate 12 is measured by the sensor 23. As is well-known, the viscosity of the sample and measured rotational rate can be used to calculate the stress, or torque, for example, by a computer processor (not shown) of the rheometer 10.

As previously described, the rheometer 10 measures viscosity or elastic properties of the material sample by applying a torque by the motor assembly 20 to the drive shaft 11 and top plate 12. The motor assembly 20 is preferably constructed to provide little or no additional torque so that rheological measurements rely on most or all of the resistance provided by the material sample to reduce errors. For example, the motor can include air bearings or the like so that the drive shaft "floats" or is surrounded by air so that no external elements except for air and the sample are in contact with the drive shaft 11 to allow as much torque on the shaft 11 as possible to come from the sample. The material sample(S) experiences a viscous resistance force when a rotational speed is imposed. As described above, in preferred embodiments, the sensor 23 is an optical encoder for measuring the rotational rate of the top plate 12. In some embodiments, the sensor 23 is a force sensor that can continuously measure a rate of deformation, shear tension, and strain rate, allowing for an analysis of time-dependent behavior. An electrical current applied to the motor forms a magnetic field which produces an electrical torque resulting in the rotation of the drive shaft 11. In some embodiments, the sensor 23 is a current sensor that measures the motor current, and the torque signal can be calculated using a computer processor (not shown) from the motor current. Electrical measurements can be determined at the same time using the electrodes to form an electric field to measure current flow. By doing this, the stress/strain mechanical properties to the electrical properties we are measuring, for example, using a computer processor to correlate current flow measurements from the sensor and torsional force measurements determined by processor from the motor current.

Figures 3A, 3B:
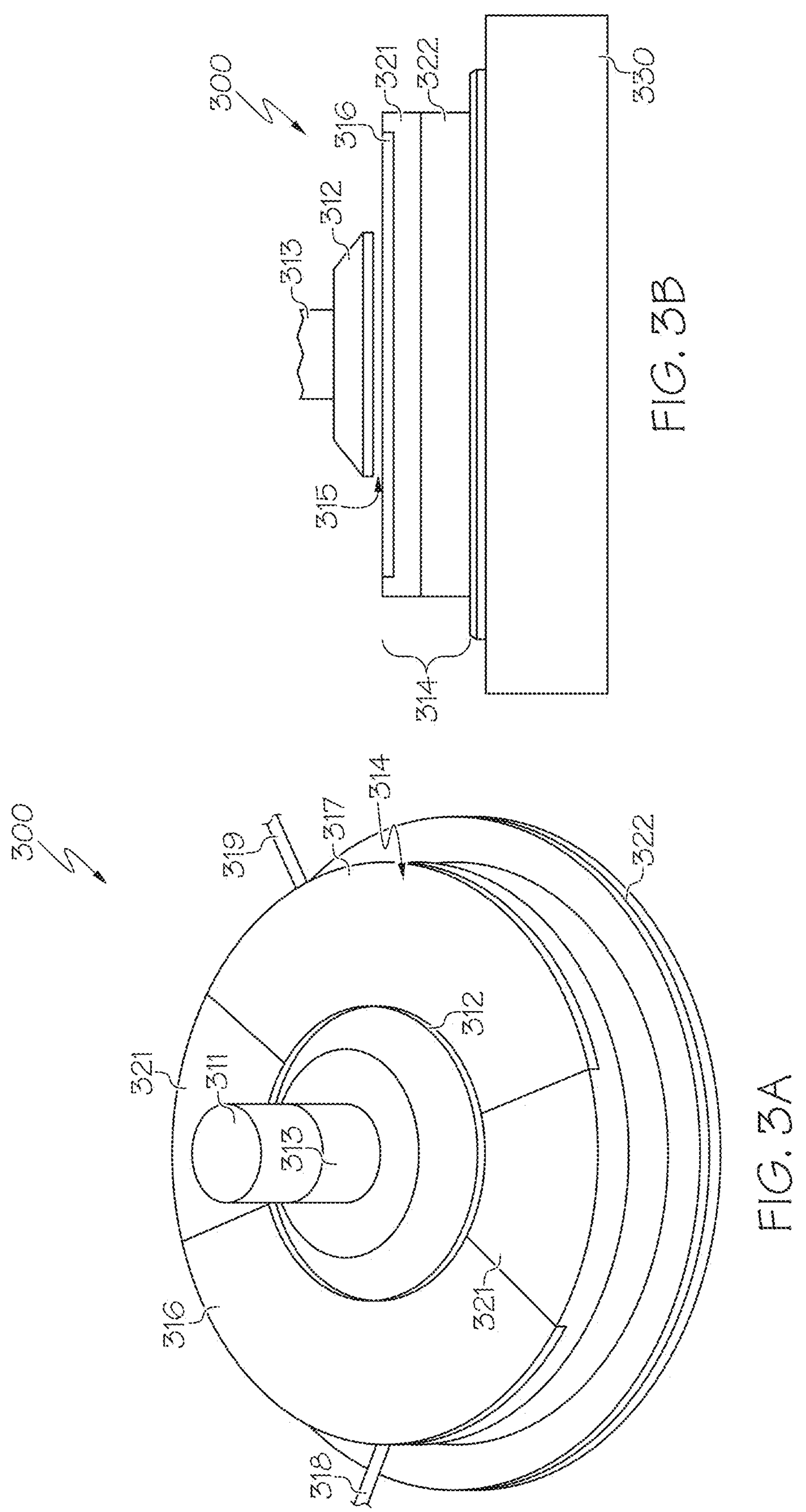
FIG. 3A is a perspective view of a rheometer in accordance with other embodiments of the present inventive concept.
FIG. 3B is a front view of the rheometer of FIG. 3A.

FIG. 3A is a perspective view of a rheometer 300 in accordance with other embodiments of the present inventive concept. FIG. 3B is a front view of the rheometer 300 of FIG. 3A. The rheometer 300 has electrodes 316, 317 similar to the electrodes 16 and 17 of FIGS. 1 and 2, except that the electrodes 316, 317 each have a larger surface area than the electrodes 16 and 17 of FIGS. 1 and 2, while maintaining isolation between the electrodes 316, 317, for example, by a ceramic material 321 mounted to a metal plate 322 forming a stationary bottom plate 314. A shaft 311 includes an insulating coupling 313 that provides conductive isolation of the shaft from the conductive top plate 312, to minimize the capacitance and conductance between the plate and the environment since the objective is to measure such properties of the sample only. The top portion of the shaft 311 is configured for coupling to a motor for rotating the shaft 311 and top plate 312. The electrodes 316, 317 are formed to have radial symmetry. Conductive wires 318, 319 can extend from a voltage generator such as an LCR meter to the electrodes 316, 317, respectively. The electrodes 316, 317 are flat by machining (e.g., grinding) the ceramic material 321 and surfaces of the electrodes 316, 317 to form a continuous flat surface. In some embodiments, the ceramic material 321, which is porous, can be coated with a thin layer of a polymer or adhesive to create a moisture seal without excessively impeding heat transfer. Other thermally conductive insulative materials can equally apply. In some embodiments, the outer diameter of the electrodes 16, 17 is aligned with and a same diameter as the outer diameter of the metal plate 322. The larger surface areas of the electrodes 16, 17 allow for a greater signal-to-noise ratio by maximizing a capacitance of the sample (not shown) in the sample gap 315 since a greater contact area with the dielectric, i.e., the gap 15 is achieved. The amount of insulation 321 between the electrodes 316, 317 is sufficient to minimize the capacitance between the electrodes. The insulation 321 is preferably a thermally conductive material due to temperature control provided by the temperature control device 330.

Figure 4B:
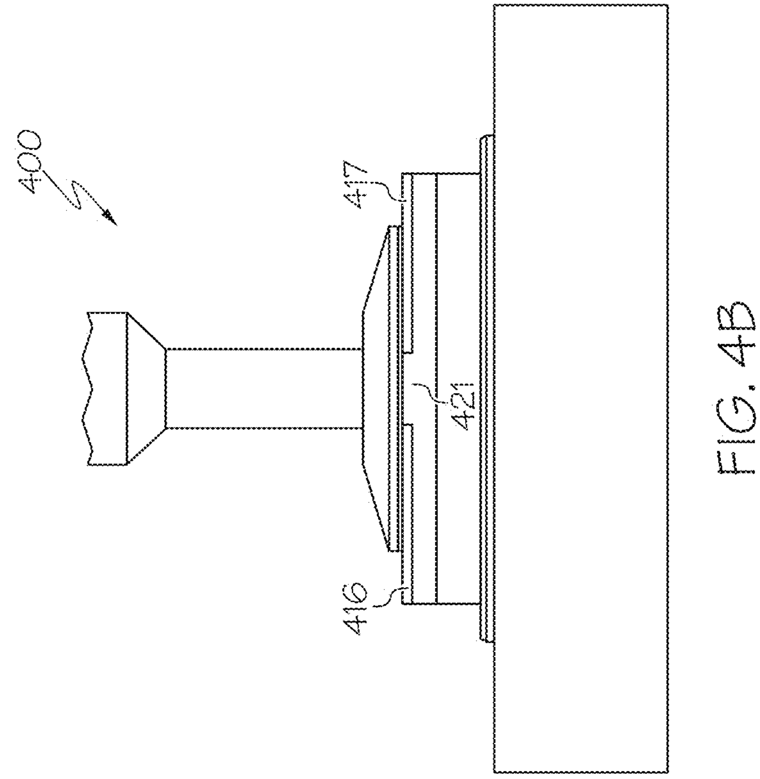
FIG. 4B is a front view of the rheometer of FIG. 4A.
Figure 4A:
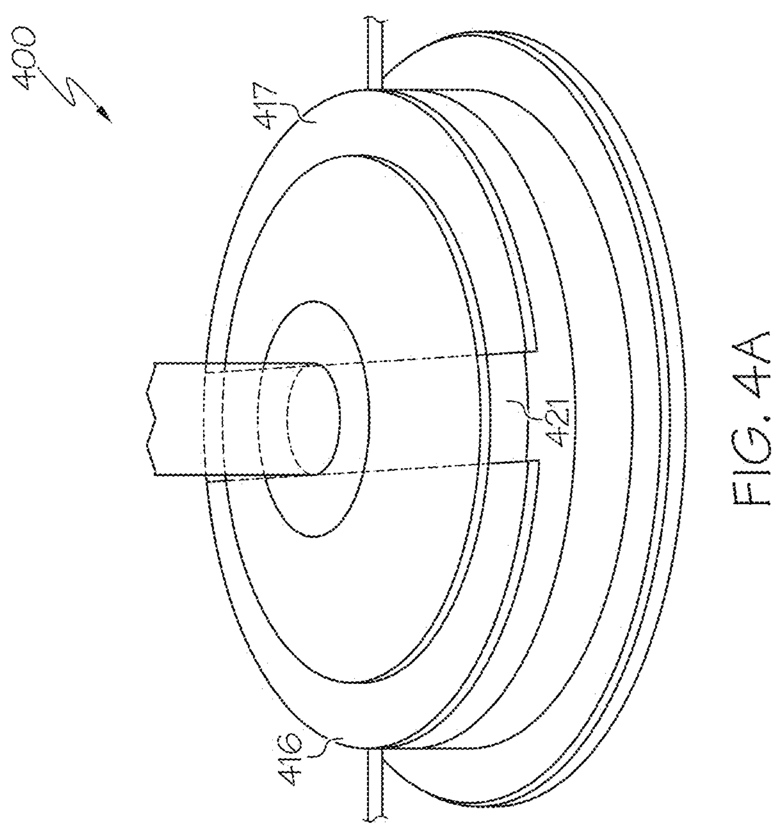
FIG. 4A is a perspective view of a rheometer in accordance with other embodiments of the present inventive concept.

FIG. 4A is a perspective view of a rheometer 400 in accordance with other embodiments of the present inventive concept. FIG. 4B is a front view of the rheometer 400 of FIG. 4A. The rheometer 400 is similar to the rheometer 300 of FIGS. 3A and 3B except for the mirror symmetry of the electrodes 416, 417 and the straight edges on the insulating part 421 to maximize the electrically active surface area.

Figure 5:
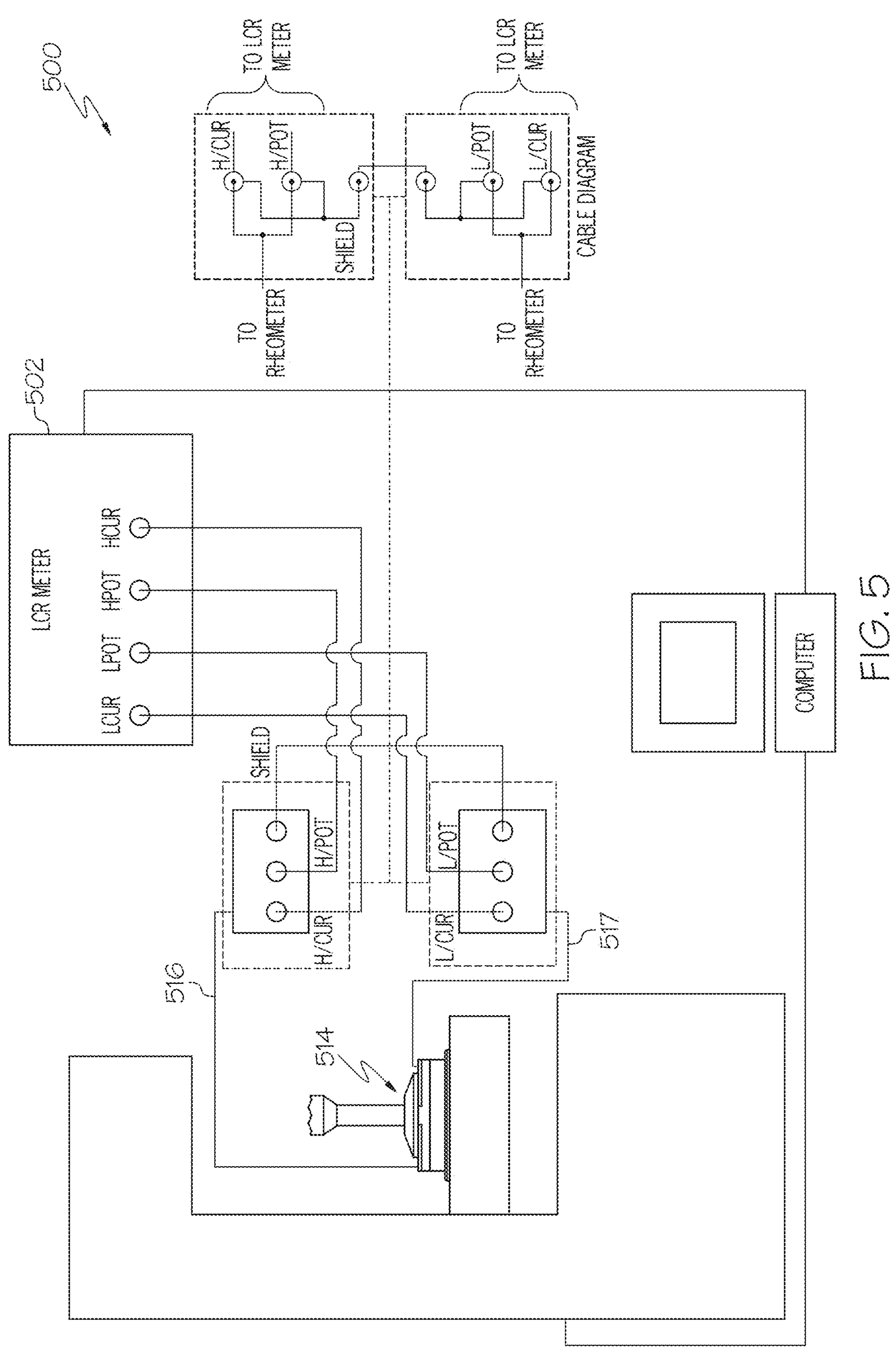
FIG. 5 depicts an electrical circuit of a rheometer in accordance with other embodiments of the present inventive concept.

FIG. 5 depicts an electrical circuit 500 of a rheometer for performing rheo-dielectric measurements in accordance with other embodiments of the present inventive concept.

As shown in FIG. 5, two electrodes 516, 517 attached to a bottom plate 514, for example, described above. An impedance analyzer such as a LCR meter 502 is provided to induce an oscillating voltage via the electrodes 516, 517 to the bottom plate 514 and measuring the electrical response.

Figure 6:
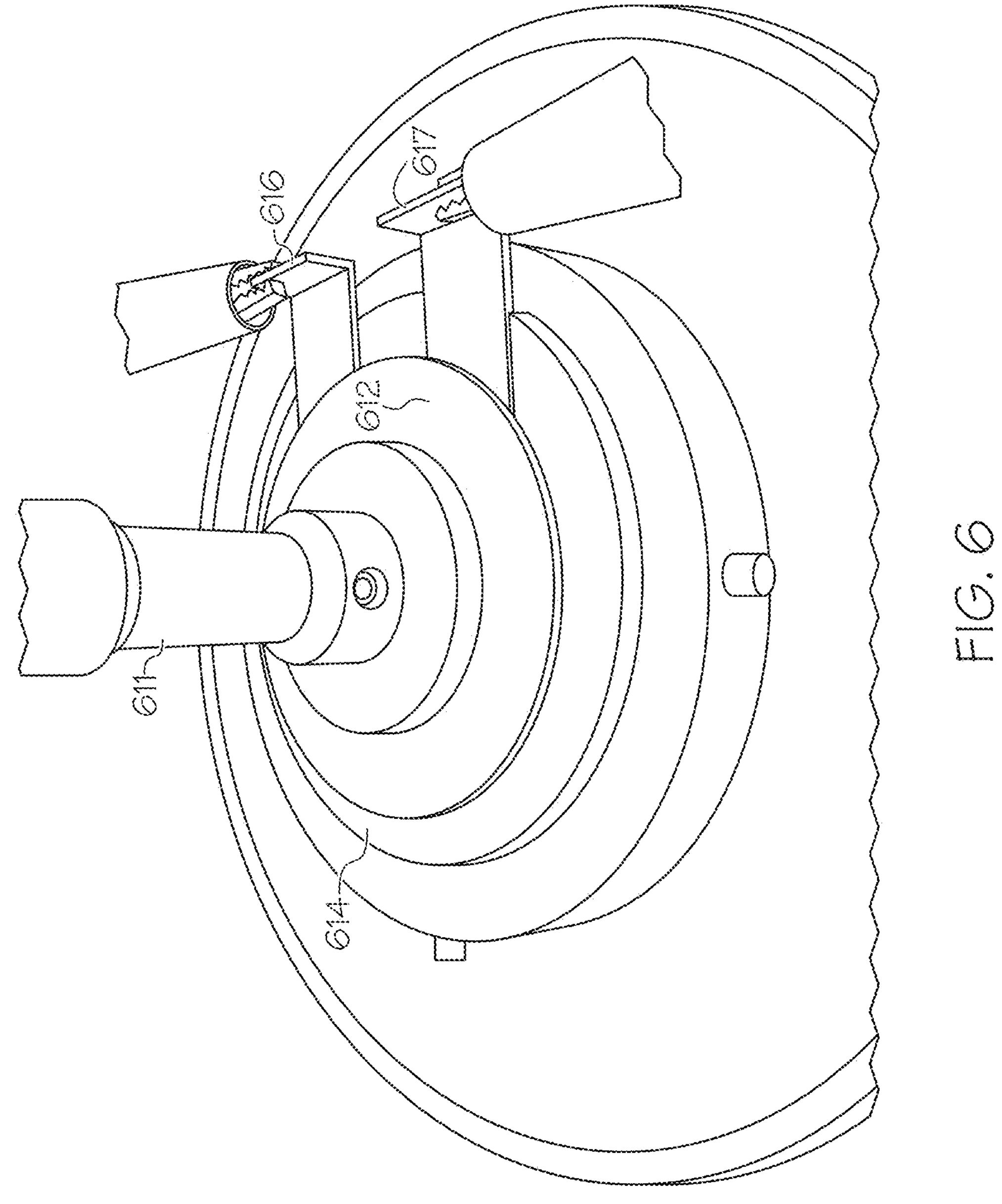
FIG. 6 is a perspective view of a rheometer in accordance with other embodiments of the present inventive concept.

FIG. 6 is a perspective view of a rheometer 600 in accordance with other embodiments of the present inventive concept. The rheometer 600 includes electrodes 616, 617 formed of a same conductive material as the top plate 612. The electrodes 616 and 617 are strip shaped copper plates with the width of 10 mm and set with 10 mm spacing between the electrodes on insulating plate 614. The top plate 612 is a copper disk with 40 mm diameter and fixed to a rotatable shaft 611 including a black insulating part. Other details of the rheometer 600 are similar to embodiments of a rheometer described above and are not repeated for brevity.

Figure 7:
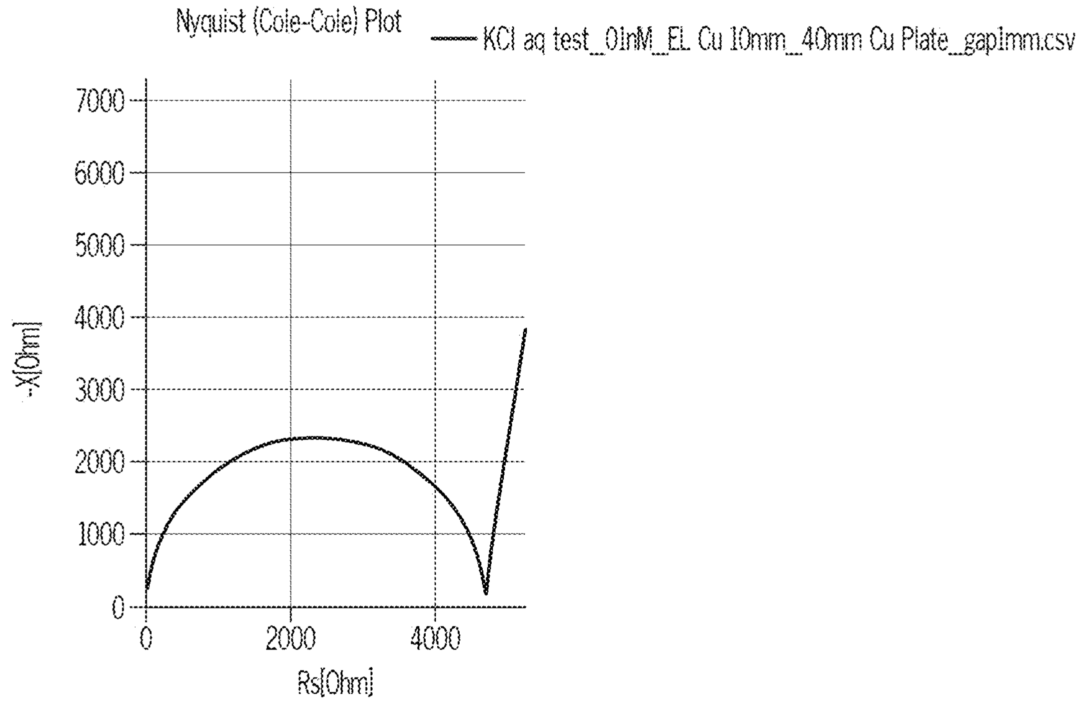
FIG. 7 is a graph illustrating a behavior of the rheometer of FIG. 6 in the form of a Nyquist (Cole-Cole) plot.
Figure 8:
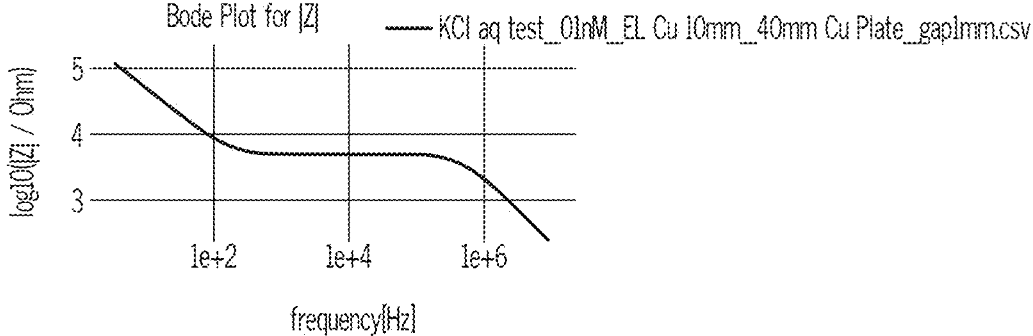
FIGS. 8 and 9 are graphs illustrating a behavior of the rheometer of FIG. 6 in the form of Bode plots.
Figure 9:
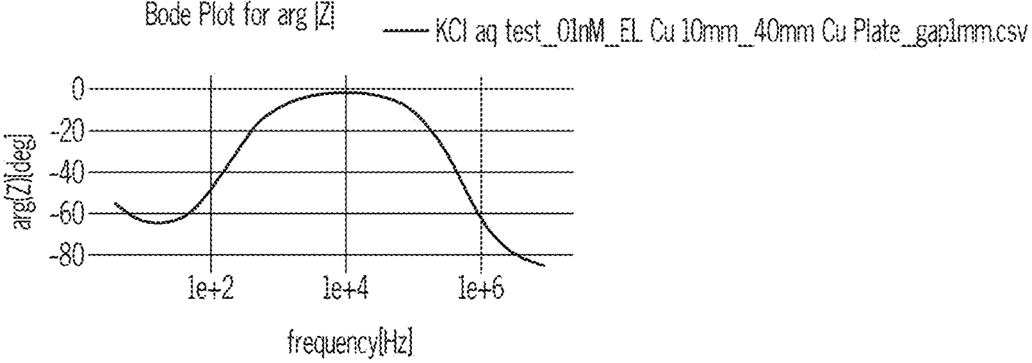

FIGS. 7, 8, and 9 are a Nyquist (Cole-Cole) plot and Bode plots of EIS measurement data using the rheometer 600 and a HIOKI LCR meter. The plots are the result of an experiment performed with a 1 mm gap between the electrodes and top plate of the rheometer under test, 0.1 V of AC voltage amplitude, and 4-8 MHz of AC frequency range using 0.1 mM potassium chloride aqueous solution as a sample.

Figure 10:
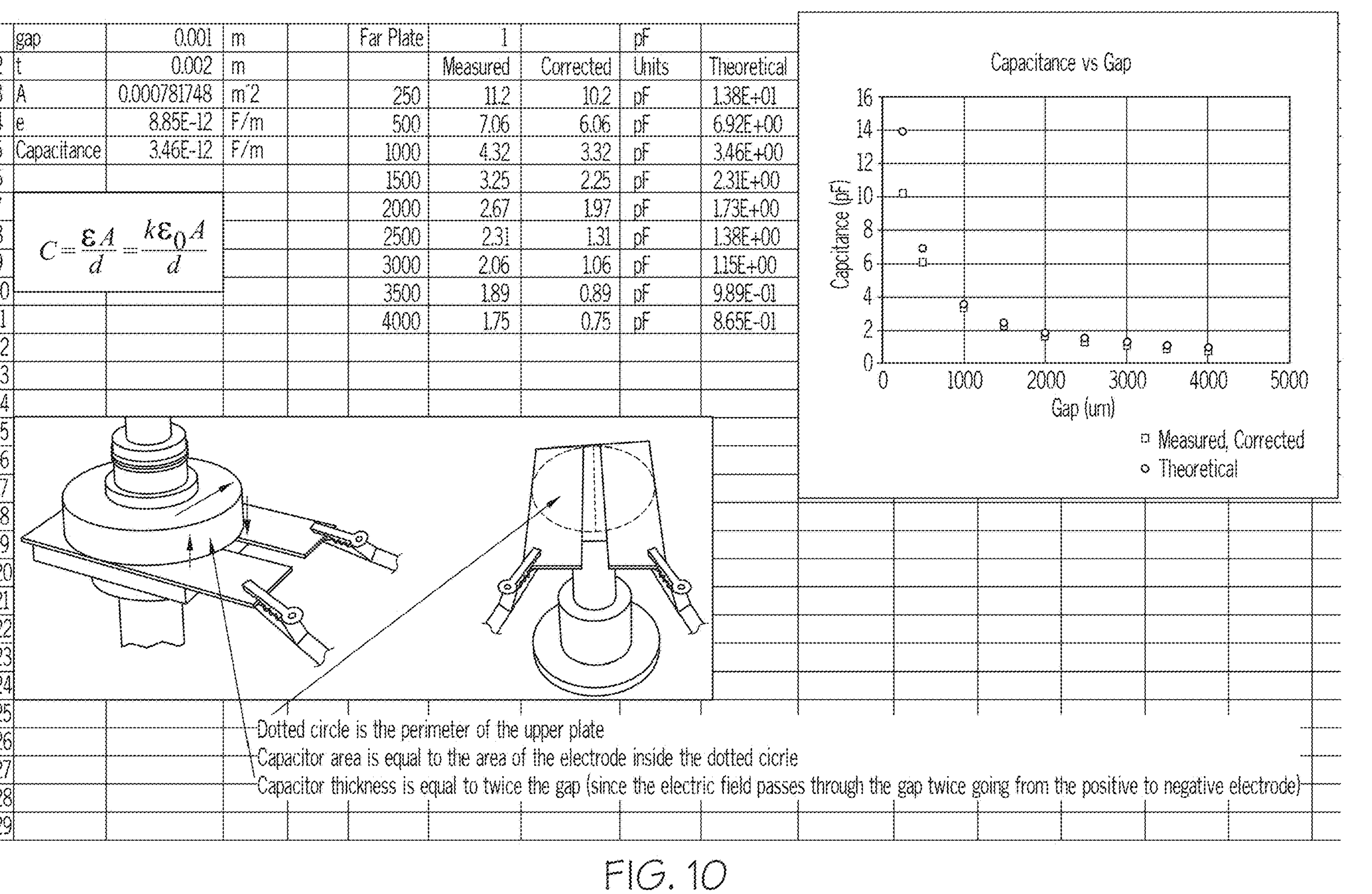
FIG. 10 depicts results of an experiment performed using a rheometer in accordance with other embodiments of the present inventive concept.

Data is provided in FIG. 10 from an experiment performed using a rheometer herein, configured to include a 50 mm OD upper plate and a 50 mm square sample plate with an 8 mm spacing between electrodes in this setup. The conductive surface of the upper plate and lower electrodes are formed of stainless steel to measure the capacitance of across air at different gaps using a Keysight™ LCR meter, since the relative permeability of air is well known to be nearly 1. Using the area of the electrode enclosed by the periphery of the plate as the capacitor area, and double the sample gap as the capacitor dielectric thickness (since the electric fields pass through twice), the calculation very well matches the theoretical prediction for a parallel plate capacitor until the gap gets relatively small. It can be deduced that the match will hold at much lower gaps with more precisely machined components.

As described above, conventional rheometers require different types of contact on the moving plate, e.g., spring, electrolyte, liquid metal, and so on, which can have an effect on measurement sensitivity. For example, a liquid contact adds error to the measurement that cannot be effectively calibrated to fall below a desired stress level, causing the measurement to deviate substantially from the same plate measurement without the electrical contact. FIGS. 7-9, on the other hand, illustrate that since the plate mechanically behaves the exact same as a traditional plate, i.e., no physical contact with the shaft, there is no measurement influence from electrical contacts, so the "friction-corrected flow curve" would be exactly the same as the "without EGain" curve because there is no additional friction to correct.

FIG. 10 includes a summary of the calculations produced for this experiment which are also pasted below in case you want to look at the formulas. The same area and distance/length should be applicable for the following formulas for example (not an exhaustive list):

$$\text{Conductance} = (\text{conductivity}) * \text{Area} / (\text{conductor length})$$

$$\text{Resistance} = (\text{Conductor length}) / (\text{conductivity} * \text{Area}) =$$

$$\text{resistivity} * (\text{Conductor length}) / (\text{Conductor Area})$$

$$\text{Capacitive Reactance}) = 1 / (2 * PI * \text{frequency} * \text{Capacitance}),$$

using the same capacitance formula.

While various examples have been shown and described, the description is intended to be exemplary, rather than limiting and it should be understood by those of ordinary skill in the art that various changes in form and detail may be made therein without departing from the scope of the invention as recited in the accompanying claims.

What is claimed is:

1. An apparatus for performing electrical and rheology measurements of a material sample, comprising:

a first plate having a conductive surface;

a second plate;

a rotatable drive shaft extending from a motor to rotate the first plate relative to the second plate; and a sample gap between the first plate and the second plate;

the second plate including first and second electrodes that receive a voltage and form a current path and/or electric field at the sample gap between the conductive surface of the first plate and the first and second electrodes at the second plate, the conductive surface of the first plate forming the current path from the first electrode through the material sample to the conductive surface of the first plate and from the conductive surface of the first plate through the material sample to the second electrode.

2. The apparatus of claim 1, wherein the electrical measurements include impedance spectroscopy measurements.

3. The apparatus of claim 1, wherein the second plate includes a thermally conductive insulator for isolating the first electrode from the second electrode, and further isolates the first electrode and the second electrode from an environment of the apparatus, and wherein the first electrode and the second electrode are thermally coupled to the environment.

4. The apparatus of claim 3, wherein the thermally conductive insulator includes a ceramic coating.

5. The apparatus of claim 3, wherein the second plate is formed of a metal material and the thermally conductive insulator is coupled to the metal plate for forming the first and second electrodes from the metal material.

6. The apparatus of claim 3, wherein a geometry of the first and second electrodes is determined by the thermally conductive insulator.

7. The apparatus of claim 3, wherein the thermally conductive insulator has a first straight edge in communication with the first electrode and a second straight edge parallel to the first straight edge in communication with the second electrode, the first straight edge separated from the second straight edge by a width that conductively insulates the first electrode from the second electrode.

8. The apparatus of claim 1, wherein the rotatable drive shaft includes an insulative material.

9. The apparatus of claim 8, wherein the first and second electrodes form the current path and/or electric field from the first and second electrodes through the material sample at the sample gap to the first plate.

10. The apparatus of claim 1, wherein the first plate is a passive conductor and has a stainless steel surface for forming the current path and/or electric field with the first and second electrodes.

11. The apparatus of claim 1, further comprising a processor that correlates current flow measurements and torsional force measurements at the first plate in contact with the material sample.

12. The apparatus of claim 11, further comprising a sensor that detects current flow of the electric field through a material sample at the sample gap and generates the current flow measurements.

13. The apparatus of claim 11, further comprising a processor that determines from a current at the motor the torsional force measurements.

14. The apparatus of claim 1, further comprising a temperature control device that exchanges a thermal conduction with the second plate.

15. The apparatus of claim 1, wherein the first and second electrodes receive voltages of different polarities to form the current path and/or electric field with the first plate through the material sample in the gap.

16. The apparatus of claim 1, wherein the first and second electrodes are formed of a same conductive material as the first plate.

17. An apparatus for performing electrical and rheology measurements of a material sample, comprising:

a first plate;

a second plate;

a rotatable drive shaft extending from a motor to rotate the first plate relative to the second plate and to induce a torsional force on the first plate; and a sample gap between the first plate and the second plate, the torsional force applied on the first plate in contact with a material sample at the sample gap;

the second plate including:

a first electrode;

a second electrode; and a thermally conductive insulator that conductively insulates the first electrode from the second electrode and further conductively insulates the first and second electrodes from the rotatable drive shaft, the first and second electrodes inducing an electric field through the material sample at the sample gap, a conductive surface of the first plate forming a current path from the first electrode through the material sample to the conductive surface of the first plate and from the conductive surface of the first plate through the material sample to the second electrode.

18. The apparatus of claim 17, wherein the electrical measurements include impedance spectroscopy measurements.

19. The apparatus of claim 17, wherein the thermally conductive insulator includes a ceramic coating.

20. The apparatus of claim 17, wherein the second plate is formed of a metal material and the thermally conductive insulator is coupled to the metal plate for forming the first and second electrodes from the metal material.

21. The apparatus of claim 17, wherein the rotatable drive shaft includes an insulative material for preventing the electric field from affecting the torsional force produced by the rotatable drive shaft.

22. The apparatus of claim 17, wherein the first and second electrodes form the electric field including the current path from the first and second electrodes through the material sample at the sample gap to the first plate.

23. The apparatus of claim 17, wherein the first plate is a passive conductor and has a stainless steel surface for forming the electric field with the first and second electrodes.

24. The apparatus of claim 17, further comprising a processor that correlates current flow measurements and torsional force measurements at the first plate in contact with the material sample.

25. The apparatus of claim 24, further comprising a sensor that detects current flow of the electric field through a material sample at the sample gap and generates the current flow measurements.

26. The apparatus of claim 24, further comprising a processor that determines from a current at the motor the torsional force measurements.

27. The apparatus of claim 17, further comprising a temperature control device that exchanges a thermal conduction with the thermally conductive insulator of the second plate.

28. The apparatus of claim 17, wherein the first and second electrodes receive voltages of different polarities to form the electric field with the first plate through the material sample in the gap.

29. An apparatus for measuring rheological and electrical properties of a sample comprising:

a first geometry comprising an electrically conductive surface and a rotatable element for rotating the first geometry;

a second geometry comprising a thermally insulative surface, the first geometry configured to rotate relative to the second geometry; and a gap between electrically conductive surface of the first geometry and the thermally insulative surface of the second geometry, the second geometry further comprising a first electrode and a second electrode that form an electric field through the gap with the electrically conductive surface of the first geometry in response to application of a voltage applied across the first and second electrodes, the electrically conductive surface of the first geometry forming a current path from the first electrode through the material sample to the conductive surface of the first plate and from the conductive surface of the first plate through the material sample to the second electrode.

* * * * *